United States Patent
Mccarty et al.

(10) Patent No.: US 10,904,273 B1
(45) Date of Patent: Jan. 26, 2021

(54) TECHNIQUES FOR IMPEDING AND DETECTING NETWORK THREATS

(71) Applicant: VERISIGN, INC., Reston, VA (US)

(72) Inventors: Benjamin Mccarty, Washington, DC (US); James Graham, Chantilly, VA (US)

(73) Assignee: VERISIGN, INC., Reston, VA (US)

( * ) Notice: Subject to any disclaimer, the term of this patent is extended or adjusted under 35 U.S.C. 154(b) by 379 days.

(21) Appl. No.: 15/821,569

(22) Filed: Nov. 22, 2017

(51) Int. Cl.
 *H04L 29/06* (2006.01)
 *H04L 29/12* (2006.01)

(52) U.S. Cl.
 CPC ...... *H04L 63/1416* (2013.01); *H04L 63/1491* (2013.01); *H04L 61/1511* (2013.01)

(58) Field of Classification Search
 CPC ............. H04L 63/1416; H04L 63/1491; H04L 63/1511
 See application file for complete search history.

(56) References Cited

U.S. PATENT DOCUMENTS

| | | | |
|---|---|---|---|
| 7,752,664 B1* | 7/2010 | Satish | G06F 21/55 713/187 |
| 2010/0274668 A1* | 10/2010 | Langston | G06Q 30/02 705/14.55 |
| 2015/0180892 A1* | 6/2015 | Balderas | H04L 63/1416 726/11 |
| 2016/0021055 A1* | 1/2016 | Krzywonos | H04L 61/1511 709/245 |

* cited by examiner

*Primary Examiner* — Joseph P Hirl
*Assistant Examiner* — Chi D Nguy
(74) *Attorney, Agent, or Firm* — Artegis Law Group, LLP

(57) ABSTRACT

In various embodiments, a name server transmits a canonical name as resolution to another canonical name. In operation, when a resource name is requested for resolution, a determination is made that the resource name corresponds to a trap resource name. A first canonical name is transmitted as resolution to the trap resource name. The first canonical name is requested for resolution, and a second canonical name is transmitted as resolution. By providing trap canonical names as resolutions to trap canonical names, unauthorized software making the resolution requests is kept occupied with requesting resolution of canonical name after canonical name, impeding the ability of the unauthorized software from traversing a network.

21 Claims, 5 Drawing Sheets

TECHNIQUES FOR IMPEDING AND DETECTING NETWORK THREATS

BACKGROUND OF THE INVENTION

Field of the Invention

Embodiments of the present invention relate generally to computer network security and, more specifically, to techniques for impeding and detecting network threats.

Description of the Related Art

Computer networks have become an indispensable part of organizations. Within an organization, the computer network connects many disparate resources together, allowing personnel within the organization to access and to share those resources. The connected resources are a draw for bad actors who want to access or damage those resources for purposes of mischief, financial gain, or other ill intent. These bad actors oftentimes use unauthorized software to penetrate the networks of organizations.

When unauthorized software penetrates the computer network of an organization through a given resource, the software typically attempts to traverse through the network in order to find additional resources within the network to access or damage. For example, ransomware that penetrates the network of an organization at one resource may try to find other resources within the network in order to encrypt the data on those other resources and hold that data for ransom. The more resources the ransomware can quickly access, the more data the ransomware can encrypt and hold for ransom before the ransomware is detected. Network administrators thus have at least two goals with respect to unauthorized software—slowing or stopping the progress at which the software traverses through the network of the organization and detecting the presence of the software so that defensive action can be taken.

To find resources within the network of the organization to access, unauthorized software typically obtains a list of resource names (e.g., through a directory) and attempts to resolve the resource names into Internet Protocol (IP) addresses by making requests to the domain name system (DNS) associated with the network domain of the organization. Thus, whether names can be resolved via a DNS substantially impacts whether unauthorized software can successfully traverse the network of an organization and access various resources.

As the foregoing illustrates, what is needed in the art are more effective ways to protect networks from unauthorized software.

SUMMARY OF THE INVENTION

Various embodiments of the present invention set forth a computer-implemented method for receiving a first domain name resolution request from a computing device, where the first resolution request includes a resource name; determining that the resource name corresponds to a trap resource name; transmitting a first canonical name to the computing device as a resolution to the resource name; receiving a second domain name resolution request from the computing device, where the second resolution request includes the first canonical name; and transmitting a second canonical name to the computing device as a resolution to the first canonical name.

Various embodiments of the present invention set forth a computer system. The computing system includes a memory including instructions, and a processor that is coupled to the memory. The processor, when executing the instructions, is configured to perform the steps of: receiving a first domain name resolution request from a computing device, where the first resolution request includes a resource name; determining that the resource name corresponds to a trap resource name; transmitting a first canonical name to the computing device as a resolution to the resource name; receiving a second domain name resolution request from the computing device, where the second resolution request includes the first canonical name; and transmitting a second canonical name to the computing device as a resolution to the first canonical name.

Various embodiments of the present invention set forth a computer-readable storage medium storing instructions which, when executed by one or more processors, cause the one or more processors to perform operations including: receiving a first domain name resolution request from a computing device, where the first resolution request includes a resource name; determining that the resource name corresponds to a trap resource name; transmitting a first canonical name to the computing device as a resolution to the resource name; receiving a second domain name resolution request from the computing device, where the second resolution request includes the first canonical name; and transmitting a second canonical name to the computing device as a resolution to the first canonical name.

One advantage of the techniques described herein is that unauthorized software is impeded in its ability to traverse a network. In particular, the described techniques trap the unauthorized software in a chain of domain name resolution requests and corresponding resolution responses. The unauthorized software is unable to traverse the network further while trapped in the chain of domain name resolution requests and corresponding resolution responses.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

Network Environment Overview

Figure 1:
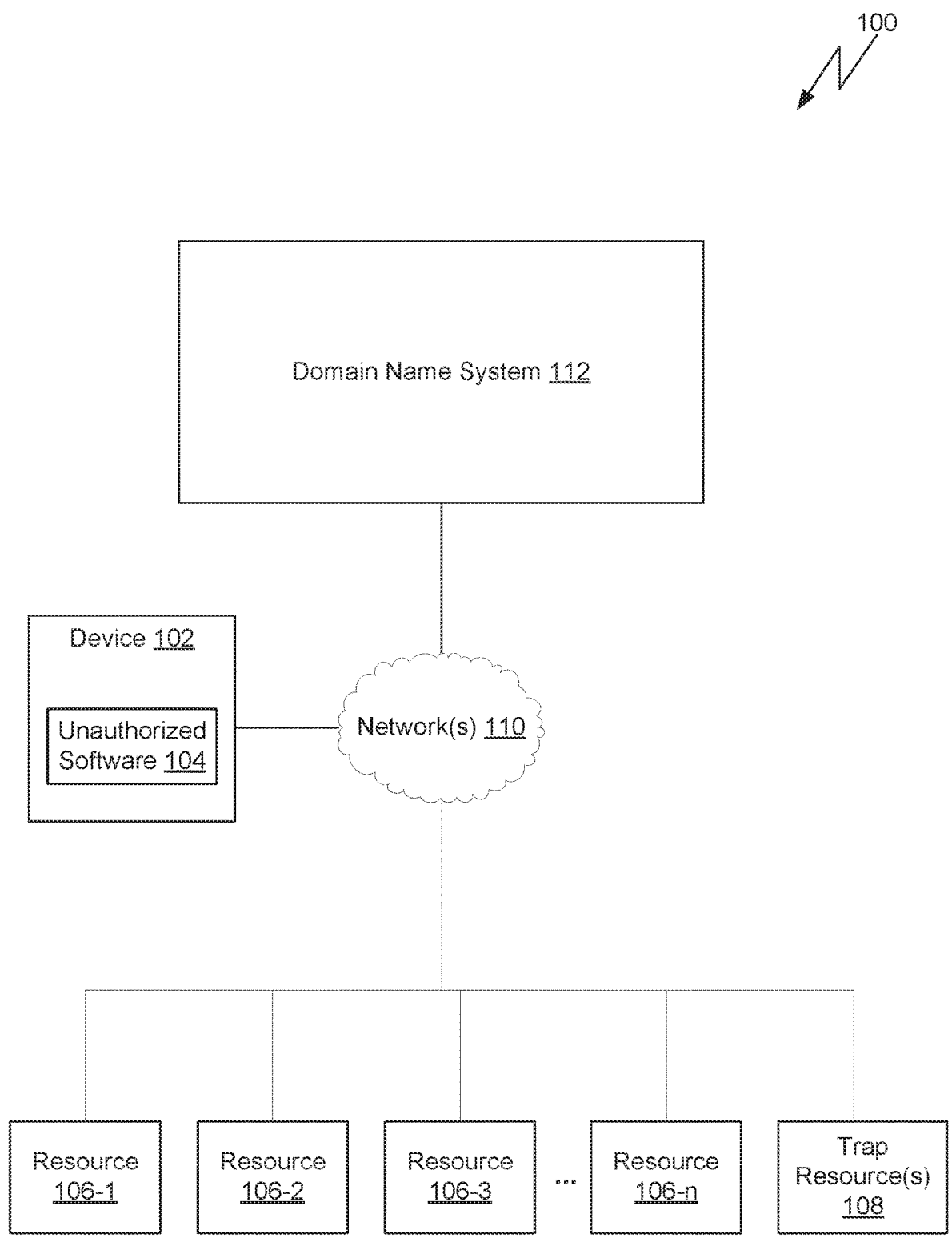
FIG. 1 illustrates a diagram of an exemplary network environment configured to implement one or more aspects of the present invention.

FIG. 1 illustrates an exemplary network environment 100 configured to implement one or more aspects of the present invention. The network environment 100 includes a device 102, one or more resources 106, one or more trap resources 108, one or more networks 110, and a domain name system 112.

The device 102 is a computing device within the network environment 100. The device 102 may be any of a desktop computer, a laptop computer, server, workstation, terminal, a tablet computer, or a smartphone. More generally, the device 102 may be any computing or electronic device that includes memory and one or more processors, is configured to execute by the processor(s) instructions (e.g., software, an application) stored in the memory, and is configured to be communicatively coupled to the network(s) 110, and via the network(s) 110, to other components in the network environment 100 (e.g., resources 106, domain name system 112).

The device 102 includes unauthorized software 104 (e.g., malware, spyware, ransomware, computer virus, etc.). The unauthorized software 104 may have been downloaded to the device 102 from a compromised source (e.g., a compromised website, a compromised email message, a compromised portable drive, a compromised flash drive). Alternatively, device 102 is itself an unauthorized device introduced into the network environment 100.

The network environment 100 includes one or more resources 106. Resources 106 may include other devices, servers, etc. in the network environment 100 that are configured to store, transmit, and receive data. Data at a resource 106 may be made available to other resources 106 within the network environment 100 (e.g., as a file share). Device 102 may itself be a resource 106 (e.g., prior to being compromised by unauthorized software 104).

The resources 106 and device 102 are communicatively coupled to one or more networks 110. Through the networks 110, the resources 106 and device 102 are communicatively coupled to each other. The network(s) 110 may include one or more of a wide area network (WAN), local area network (LAN), wireless networks (e.g., Wi-Fi network, cellular network), the Internet, virtual private networking network, and so forth. The resources 106 and device 102 are organized under a common domain (e.g., the domain associated with an organization) within the network 110. Each resource 106, including device 102, has a resource name within the domain. A resource name includes the name of the domain, as well as any number of lower-level names for identification within the domain. For example, each resource 106 may have a resource name in the format "AAAAAA.example-co.com," where "exampleco.com" is the name of the domain name, and "AAAAAA" is replaced with a lower-level name that identifies the resource 106 within the domain. In some embodiments, the network 110 includes a directory (not shown) of resources that identify the resources by resource name. A device on the network 110 may find the resources 106, including device 102, by accessing the directory. The directory may be stored at any of the resources 106, and may be accessed within the domain by any of the resources 106 and the device 102.

Domain name system (DNS) 112 resolves resource names within the network 110, including resource names within the domain of the organization. In some embodiments, the DNS 112 is configured to resolve resource names of resources in one or more domains, including the domain of the organization. The DNS 112 may include one or more name servers configured to handle domain name resolution requests and return responses to domain name resolution requests. In some embodiments, the DNS 112 includes one or more name servers that are assigned to be the name server(s) for the domain of the organization. Whenever a device, or more particularly software on the device, attempts to access a resource 106, the software obtains a resource name of the resource 106 (e.g., from the directory), and transmits a domain name resolution request that includes the resource name of the resource 106 to the DNS 112 in order to obtain an IP address of the resource 106. That is, the software requests the DNS 112 to resolve the resource name of the resource 106 into an IP address of the resource 106.

In response to the domain name resolution request, the DNS 112 maps the requested resource name to an IP address or another name. The DNS 112 returns the mapped name or IP address to the software as resolution to the requested resource name (e.g., by transmitting a response that includes the name or IP address to the device). If an IP address is returned, then the software may address, and thus access, the resource 106 by the returned IP address. If another name is returned, the software may make a second request to the DNS 112 to resolve that name. The DNS 112 may return an IP address or yet another name in response to that second request. If yet another name is returned, the software may request resolution of that name, and so on, until an IP address is returned, an error is returned, a timeout is returned, or either the software or the DNS 112 quits.

After the unauthorized software 104 has connected to the network(s) 110 from device 102, the unauthorized software 104 proceeds to identify resources 106 coupled to the network 110 to further access and compromise. The unauthorized software 104 identifies the resources 106 by obtaining resource names of the resources 106 via the network 110 (e.g., from the directory). The unauthorized software 104 makes requests to the DNS 112 to resolve the resource names into IP addresses of the resources 106.

The DNS 112 includes one or more trap resource names (not shown) defined or generated within the DNS 112. In some embodiments, a trap resource name is the resource name of a trap resource 108, where the trap resource 108 is an actual resource 106 within the network environment 100. For example, the trap resource 108 may be a resource 106 (e.g., a device, a server) that is configured to store junk data or no data; the trap resource 108 serves as a trap or honeypot resource for unauthorized software (e.g., unauthorized software 104). In some other embodiments, a trap resource name is a fake resource name that is included in the directory, but does not refer to or correspond to any actual resource 106 within the network environment 100. In some embodiments, in normal operation the other resources 106 in the network environment 100 do not attempt to access the trap resource, and thus do not request resolution of the trap resource name. One or multiple trap resource names may be defined or generated for the domain to which resources 106 and device 102 belong.

The DNS 112 maps a trap resource name to a first trap canonical name. That is, the DNS 112 includes a first name that is set as a canonical name for the trap resource name. The DNS 112 maps the first trap canonical name to a second trap canonical name; the DNS 112 includes a second name that is set as a canonical name for the first trap canonical name. The DNS 112 maps the second trap canonical name to a third trap canonical name, maps the third trap canonical name to a fourth trap canonical name, and so on. Thus, the DNS 112 includes a set of trap canonical names, in which a trap canonical name in the set maps to another trap canonical name in the set in a chain-like manner.

After unauthorized software 104 obtains resource names (e.g., from the directory), the unauthorized software 104 makes domain name resolution requests to the DNS 112 to resolve the resource names into IP addresses. The unauthorized software 104 may make the requests one name at a time. For each request, the DNS 112 determines whether the requested name corresponds to a trap resource name. In some embodiments, the determination is made by determining whether requested name matches a trap resource name. If the requested name corresponds to a trap resource name, the DNS 112 maps the trap resource name to a trap canonical name.

In response to a request from unauthorized software 104 that requests resolution of a name that corresponds to a trap resource name, the DNS 112 maps the trap resource name to a first trap canonical name, and returns the first trap canonical name to the unauthorized software 104 as resolution of the trap resource name. The unauthorized software 104 may make a second request to the DNS 112 to resolve the first trap canonical name. In response to the second request, the DNS 112 maps the first trap canonical name to a second trap canonical name, and returns the second trap canonical name to the unauthorized software 104. The unauthorized software 104 may make a third request to resolve the second trap canonical name, and the DNS 112 maps the second trap canonical name to a third trap canonical name, and returns the third trap canonical name to the unauthorized software 104, and so on. The unauthorized software 104 and the DNS 112 continue this chain of domain name resolution requests and responses with canonical names, where the unauthorized software 104 attempts to get an IP address for the trap resource name, and the DNS 112 returns canonical name after canonical name to the unauthorized software 104. Thus, the unauthorized software is trapped in a domain name resolution chain with the DNS 112. The chain is started by the request to resolve the trap resource name and resolution of the trap resource name into a trap canonical name, and is maintained by the chain of trap canonical names. The DNS 112 may log the requests and responses in the chain, thus generating an activity trail of the unauthorized software 104. The activity trail may be a basis for detecting and investigating the unauthorized software 104 in the network environment 100.

A domain name system may include an authoritative name server and, optionally, a recursive name server. An authoritative name server includes resource records that explicitly maps names to, for example, other names or IP addresses. A recursive name server may be an intermediary between devices requesting resolution of names and the authoritative name server. Domain name resolution requests from devices may be received by the authoritative name server or the recursive name server. If received by the authoritative name server, the authoritative name server resolves the requested names responsive to the requests. If received by the recursive name server, the recursive name server requests resolution from the authoritative name server on behalf of the devices. The authoritative name server returns responses to the resolution requests to the recursive name server, which forwards the responses to the requesting devices. A recursive name server may also resolve a name without involving the authoritative name server. For example, the recursive name server may cache resource records from prior resolution requests and/or responses to devices corresponding to prior resolution requests, and resolve names based on the cached records and responses if a matching record or response is found amongst the cached records and responses. In some embodiments, the DNS 112 includes an authoritative name server and optionally a recursive name server, and the various embodiments described herein may be implemented at an authoritative name server or at a recursive name server, further details of which are described below with reference to FIGS. 2-3.

Figure 2:
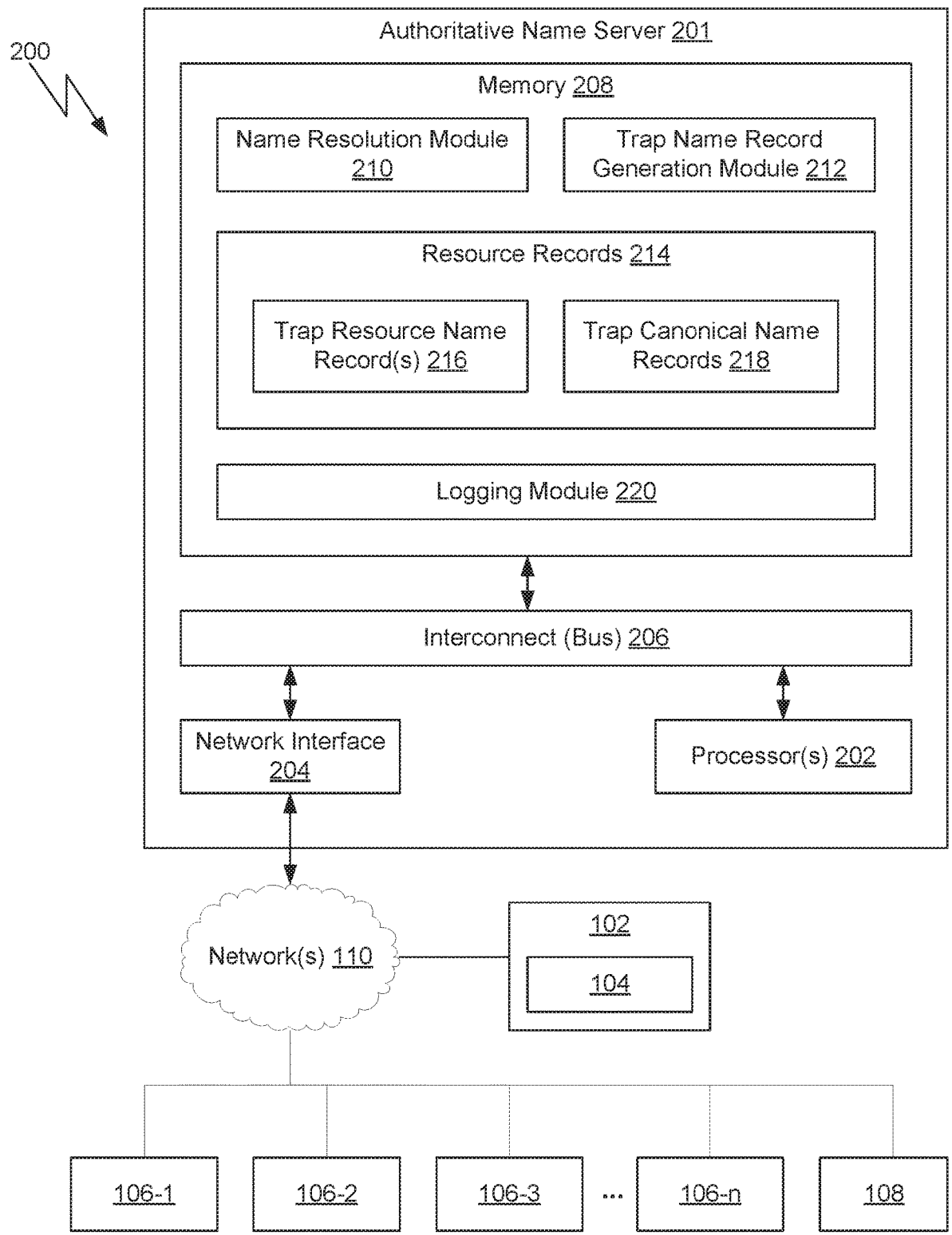
FIG. 2 illustrates a diagram of another exemplary network environment in which an authoritative name server is implemented, according to various embodiments of the present invention.

FIG. 2 illustrates network environment 200 in which an authoritative name server 201 is implemented, according to various embodiments of the present invention. The network environment 200 is similar to network environment 100 in multiple respects, including device 102 and resources 106 in a common domain, networks 110, and unauthorized software 104 in device 102. Network environment 200 further includes the authoritative name server 201, which may be a server system that includes one or more server computing devices. In some embodiments, the authoritative name server 201 is a component system (e.g., a name server) of DNS 112.

As shown, the authoritative name server 201 includes one or more processing units (processors) 202, a network interface 204, and memory 208. In some embodiments, processor(s) 202 may be coupled to the network interface 204 and the memory 208 via an interconnect (computer bus) 206. In some other embodiments, processor(s) 202 may be coupled to network interface 204 and memory 208 directly. The processor(s) 202 may be a central processing unit (CPU), a graphics processing unit (GPU), or a combination of different processing units, such as a CPU configured to operate in conjunction with a GPU. In general, processor(s) 202 may be any technically feasible hardware unit capable of processing data and/or executing software applications.

In some embodiments, the processors 202 are coupled to one or more input/output (I/O) devices (not shown) via interconnect 206 or directly. I/O devices may include input devices capable of receiving input, and output devices capable of generating output. Examples of input devices include a keyboard, a mouse, a touchscreen, a microphone, or other input devices or elements. Examples of output devices include a monitor, a printer, or other output devices or elements.

A network interface 204 is capable of communicating via one or more networks 110. The network interface 204 may be coupled to the processor(s) 202 and memory 208 via the interconnect 206 or directly.

Memory 208 stores content, such as software applications and data, for execution or use by the processor(s) 202. As shown, the memory 208 includes, without limitation, a name resolution module 210, an (optional) trap name record generation module 212, resource records 214, and logging module 220. In some embodiments, name resolution module 210 and trap name record generation module 212 are software applications or programs that are configured for execution by the processor(s) 202. The name resolution module 210 processes domain name resolution requests and generates responses to domain name resolution requests, including processing resolution requests for trap resource names and trap canonical names and generating responses to these requests. The trap name record generation module 212 generates trap resource names and/or trap canonical names, and generates associated trap resource name records and/or trap canonical name records.

The authoritative name server 201 includes resource records 214. A resource record 214 maps a name to, for example, an IP address or another name. The resource records 214 may include records that map names to names and records that map names to IP addresses. A name-to-name record maps a name to another name (e.g., a resource name to a canonical name, a canonical name to another canonical name). A name-to-IP-address record maps a name to an IP address (e.g., a resource name to an IP address, a canonical name to an IP address). Included among the resource records 214 are trap resource name records 216 and trap canonical name records 218. In some embodiments, trap resource records 216 and/or trap canonical name records 218 may be generated by the trap name record generation module 212 or predefined.

A trap resource name record 216 is a resource record that maps a trap resource name to a trap canonical name. The trap canonical name that the trap resource name maps to is a first name of a set of trap canonical names that map to other names in the set of trap canonical names in a chain-like manner. A trap resource name may be predefined by a network administrator, or generated by the authoritative name server 201 (e.g., by trap name record generation module 212). A trap resource name record 216 for the trap resource name may be predefined by the network administrator, or generated by the trap name record generation module 212. Trap resource name records 216 may be stored in memory 208 in any suitable data structure or data storage format (e.g., as a text file, as a database, as a table, etc.).

In some embodiments, the trap resource name record(s) 216 are formatted as CNAME records. A CNAME record in a domain name system maps a name to a canonical name. For example, say that a trap resource name record reads as "trap.example.com CNAME chain0.00000.vrsn.com." In this example, the name "chain0.00000.vrsn.com" is the canonical name for the trap resource name "trap.example.com"; the trap resource name "trap.example.com" is mapped to the canonical name "chain0.00000.vrsn.com." Thus, when resolution of the name "trap.example.com" is requested, the canonical name "chain0.00000.vrsn.com" may be returned.

In some embodiments, trap resource name record(s) 216 are predefined. For example, resource records 214 may be populated with one or more predefined trap resource name records 216 by a network administrator. In these trap resource name records 216, the trap resource name and the trap canonical name to which the trap resource name is mapped are predefined. In some other embodiments, trap resource name record(s) 216 are generated by the authoritative name server 201 (e.g., in response to a request to resolve a trap resource name, in response to a determination that the resource name in a resolution request corresponds to a trap resource name). For example, one or more trap resource names may be predefined by the network administrator or generated by the trap name record generation module 212. In response to a first-ever request to resolve a particular trap resource name, the authoritative name server 201 generates a trap resource name record that maps the particular trap resource name to a trap canonical name, where the trap canonical name may be predefined by a network administrator or generated by the authoritative name server 201. Subsequent requests to resolve the particular trap resource name may be resolved based on the generated trap resource name record. Trap resource name records 216 may include predefined and/or generated records.

The resource records 214 also include trap canonical name records 218. The trap canonical name records 218 are resource records that map names in the set of trap canonical names to other names in the set of trap canonical names in a chain-like manner. For example, a first trap canonical name record maps a first name (e.g., the trap canonical name to which a trap resource name is mapped) to a second name in the set of trap canonical names, a second trap canonical name record maps the second name to a third name in the set of trap canonical names, a third trap canonical name record maps the third name to a fourth name in the set of trap canonical names, and so forth. The chain may eventually end (e.g., the set of trap canonical names is finite), or continue indefinitely (e.g., the set of trap canonical names is indefinite, or the set of trap canonical names is finite but the mappings can loop back to the first name). Trap canonical name records 218 may be stored in memory 208 in any suitable data structure or data storage format (e.g., as a text file, as a database, as a table, etc.).

In some embodiments, trap canonical name records 218 are predefined. For example, resource records 214 may be populated with one or more predefined trap canonical name records 218 by a network administrator. In these trap canonical name records 218, the trap canonical names are predefined. In some other embodiments, trap canonical name record 218 are generated by the authoritative name server 201 (e.g., in response to a request to resolve a trap canonical name, in response to a determination that the resource name in a resolution request corresponds to a trap canonical name). For example, one or more trap canonical names may be predefined by the network administrator or generated by the trap name record generation module 212. In response to a first-ever request to resolve a particular trap canonical name, the authoritative name server 201 generates a trap canonical name record that maps the particular trap canonical name to another trap canonical name, where the mapped-to trap canonical name may be predefined by a network administrator or generated by the authoritative name server 201. Subsequent requests to resolve the particular trap canonical name may be resolved based on the generated trap canonical name record. In further embodiments, trap canonical name records 218 may include both predefined and generated records (e.g., a seed set of predefined records and generated records that continue the chain from the seed set). Trap canonical name records 218 may include predefined and/or generated records.

In some embodiments, as with the trap resource name records 216, the trap canonical name records 218 are formatted as CNAME records. For example, say that the trap canonical name records 218 include three records that read as "chain0.00000.vrsn.com CNAME chain0.00001.vrsn.com," "chain0.00001.vrsn.com CNAME chain0.00002.vrsn.com," and "chain0.00002.vrsn.com CNAME chain0.00003.vrsn.com." In these example records, the name "chain0.00000.vrsn.com" is mapped to the canonical name "chain0.00001.vrsn.com." The name "chain0.00001.vrsn.com" is mapped to the canonical name "chain0.00002.vrsn.com." The name "chain0.00002.vrsn.com" is mapped to the canonical name "chain0.00003.vrsn.com."

In some embodiments, the set of trap canonical names is an ordered sequence of names, and the chain of name mappings in the trap canonical name records 218 follow the ordering of the sequence. For example, in the example trap canonical name records described above, "chain0.00000.vrsn.com," "chain0.00001.vrsn.com," "chain0.00002.vrsn.com," and "chain0.00003.vrsn.com" are names in the ordered sequence (as indicated by the numerals 00000, 00001, 00002, and 00003 in the names). The trap canonical name records map the names in accordance with the ordered sequence, as shown in the example above. In some other embodiments, the set of trap canonical names is a random sequence of names. Another example of the ordered sequence, as well as further details regarding ordered sequences and random sequences of trap canonical names, are described below in reference to FIG. 4.

The name resolution module 210 receives domain name resolution requests (e.g., sent by device 102 or resources 106), and processes the requests to identify names for which resolution is requested. The name resolution module 210 identifies resource records 214 responsive to the requests (e.g., resource records that match the requested names and map the requested names to IP addresses or other names). The name resolution module 210 generates responses to the requests in accordance with the identified resource records.

The trap name record generation module 212 generates trap resource name records 216 and/or trap canonical name records 218. The trap name record generation module 212 may generate one or more records periodically (e.g., periodically to add to trap canonical name records 218), as needed (e.g., responsive to a resolution request to resolve a particular trap resource name or trap canonical name), or on demand (e.g., responsive to a command from an administrator). When the name resolution module 210 identifies a name requested for resolution in a resolution request, the trap name record generation module 212 may be activated by the name resolution module 210 to generate a trap canonical name, and a corresponding trap resource name record or trap canonical name record, responsive to the request. In some embodiments, the trap name record generation module 212 is a sub-module of the name resolution module 210.

Logging module 220 logs domain name resolution requests received by the authoritative name server 201, and the corresponding responses. The requests and responses may be logged in a log, history, database, or the like (not shown), which may be stored in memory 208.

When the authoritative name server 201 receives a request to resolve a trap resource name or trap canonical name, the authoritative name server 201 (e.g., the name resolution module 210) checks the resource records 214 to identify a trap resource name record or a trap canonical name record that maps the requested trap resource or canonical name to another trap canonical name. If such a record is identified, the authoritative name server 201 returns the mapped-to trap canonical name as a resolution to the requested trap resource or canonical name. If such a record is not identified within the resource records 214, the authoritative name server 201 may generate such a record, add the generated record to the resource records 214 (as a trap resource name record 216 or trap canonical name record 218, depending on what the requested name is), and provide the mapped-to trap canonical name from the generated record as a resolution to the requested trap resource or canonical name.

In some embodiments, network environment 200 includes one or more recursive name servers (not shown) as well as the authoritative name server 201; the authoritative name server 201 and recursive name server are components of the DNS 112. When the unauthorized software 104 makes a domain name resolution request for a trap resource name or a trap canonical name, the recursive name server receives the request. The recursive name server requests resolution from the authoritative name server 201 on behalf of the unauthorized software 104, or alternatively forwards the request to the authoritative name server 201. The authoritative name server 201 returns a response to the recursive name server, which forwards the response to the unauthorized software 104. In these embodiments, the recursive name server treats domain name resolution requests to resolve trap resource names or trap canonical names as normal domain name resolution requests and passes them on to the authoritative name server 201; the trap nature of the trap resource names and trap canonical names are transparent to the recursive name server.

Figure 3:
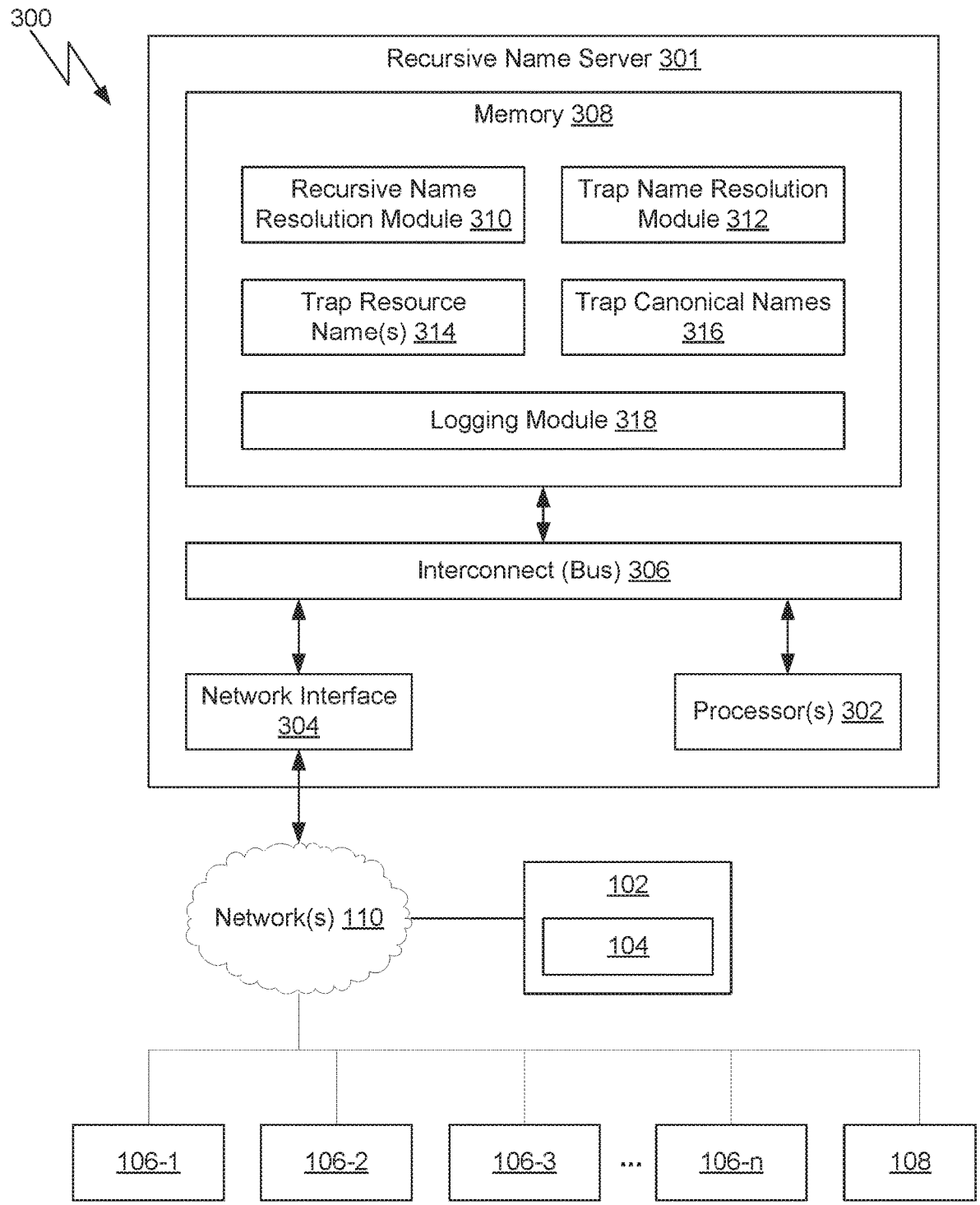
FIG. 3 illustrates a diagram of yet another exemplary network environment in which a recursive name server is implemented, according to other various embodiments of the present invention.

FIG. 3 illustrates network environment 300 in which a recursive name server 301 is implemented, according to various embodiments of the present invention. The network environment 300 is similar to network environment 100 in multiple respects, including device 102 and resources 106 in a common domain, networks 110, and unauthorized software 104 in device 102. Network environment 300 further includes the recursive name server 301, which may be a server system that includes one or more server computing devices. In some embodiments, the recursive name server 301 is a component system (e.g., a name server) of DNS 112. In some embodiments, network environment 300 also includes an authoritative name server (not shown), which may also be a component system of DNS 112.

The recursive name server 301 includes one or more processing units (processors) 302, a network interface 304, and memory 308. In some embodiments, processor(s) 302 may be coupled to the network interface 304 and the memory 308 via an interconnect (computer bus) 306. In some other embodiments, processor(s) 302 may be coupled to network interface 304 and memory 308 directly. The processor(s) 302 may be a central processing unit (CPU), a graphics processing unit (GPU), or a combination of different processing units, such as a CPU configured to operate in conjunction with a GPU. In general, processor(s) 302 may be any technically feasible hardware unit capable of processing data and/or executing software applications.

In some embodiments, the processors 302 are coupled to one or more input/output (I/O) devices (not shown) via interconnect 306 or directly. I/O devices may include input devices capable of receiving user input, and output devices capable of generating output. Examples of input devices include a keyboard, a mouse, a touchscreen, a microphone, or other input devices or elements. Examples of output devices include a monitor, a printer, or other output devices or elements.

A network interface 304 is capable of communicating via one or more networks 110. The network interface 304 may be coupled to the processor(s) 302 and memory 308 via the interconnect 306 or directly.

The memory 308 stores content, such as software applications and data, for execution or use by the processor(s) 302. As shown, the memory 308 includes, without limitation, a recursive name resolution module 310, a trap name resolution module 312, trap resource name(s) 314, trap canonical names 316, and logging module 318. In some embodiments, recursive name resolution module 310 and trap name resolution module 312 are software applications or programs that are configured for execution by the processor(s) 302. The recursive name resolution module 310 is configured to process name resolution requests and generates responses to name resolution requests. The trap name resolution module 312 is configured to process resolution requests for trap resource names and trap canonical names and generating responses to these requests.

The recursive name resolution module 310 receives domain name resolution requests (e.g., sent by device 102 or resources 106), and processes the requests to identify names for which resolution is requested. For domain name resolution requests that request resolution of non-trap names, the recursive name resolution module 310 identifies a cached resource record or response (not shown) that match the requested non-trap name or makes a request to an authoritative name server of the DNS 112 to request resolution of the non-trap name. The recursive name resolution module 310 generates a response based on the identified cached resource record or receives a response from the authoritative name server. The recursive name resolution module 310 returns the response to the requesting device or resource. The recursive name server 301 may store cached resource records and responses (not shown) in in the memory 308.

The trap name resolution module 312 handles (e.g., processes) domain name resolution requests that request resolution of trap resource names or trap canonical names, and generates response to these requests. If the recursive name resolution module 312 identifies a trap resource name or trap canonical name as the name for which resolution is requested in a domain name resolution request (e.g., by comparing the requested name against the trap resource names 314 and trap canonical names 316), the recursive name resolution module 310 passes the request to the trap name resolution module 312 for handling. The trap name resolution module 312 obtains trap canonical names 316 responsive to the requests, and returns responses to the requests that include the obtained trap canonical names as resolution to the requested names. In some embodiments, the functionality of the trap name resolution module 312 is included in the recursive name resolution module 310 (e.g., the trap name resolution module 312 is a sub-module of the recursive name resolution module 310).

In some embodiments. The trap name resolution module 312 also generates trap canonical names 316. In response to a domain name resolution request to resolve a trap resource name or trap canonical name, the trap name resolution module 312 generates a trap canonical name as resolution to the requested trap resource name or trap canonical name.

Trap resource name(s) 314 store one or more trap resource names. The recursive name resolution module 310 compares names requested for resolution to the trap resource names 314 to identify trap resource names in the requests. The requests with trap resource names are handled by the trap name resolution module 312 for resolution. Trap resource names 314 may be stored in memory 308 in any suitable data structure or data storage format (e.g., as a text file with a list of names, as a database, as a table, etc.).

Trap canonical names 316 store trap canonical names for resolution of trap resource names or trap canonical names. The recursive name resolution module 316 compares names requested for resolution to the trap canonical names 316 to identify trap canonical names in the requests. Requests with trap canonical names are handled by the trap name resolution module 312 for resolution. Trap canonical names to be returned in responses to requests to resolve trap resource or canonical names may be obtained from trap canonical names 316. Trap resource names 316 may be stored in memory 308 in any suitable data structure or data storage format (e.g., as a text file with a list of names, as a database, as a table, etc.).

Logging module 318 logs domain name resolution requests received by the recursive name server 301, and the corresponding responses. The requests and responses may be logged in a log, history, database, or the like (not shown), which may be stored in memory 308.

The recursive name server 301 receives domain name resolution requests from resources 106 and device 102, including requests from unauthorized software 104. When the recursive name server 301 receives a domain name resolution request to resolve a name, a trap name resolution module 312 determines whether the requested name corresponds to a trap resource name by comparing the requested name to the trap resource names 314. If the requested name matches a trap resource name 314, the trap name resolution module 312 returns a response that includes a first trap canonical name of the trap canonical names 316 to the unauthorized software 104. The recursive name server 301 forgoes involving an authoritative name server in the resolution of the trap resource name.

The unauthorized software 104 may make a second request to resolve the first trap canonical name. The recursive name server 301 receives the second request. In response to the second request, the trap name resolution module 312 returns a response that includes a second trap canonical name of the trap canonical names 316 to the unauthorized software 104. The unauthorized software 104 may make a third request to resolve the second trap canonical name. The recursive name server 301 receives the third request. In response to the third request, the trap name resolution module 312 returns a response that includes a third trap canonical name of the trap canonical names 316 to the unauthorized software 104. The unauthorized software 104 may request resolution of the third trap canonical name, and so on. In response, the trap name resolution module 312 returns a response with a fourth trap canonical name of the trap canonical names 316, and so on.

The recursive name server 301 forgoes making or forwarding requests to an authoritative name server to resolve the trap resource names and trap canonical names. Thus, in some embodiments, the recursive name server 301 handles resolution requests involving trap resource names and trap canonical names within the DNS 112. The trap nature of the trap resource names and trap canonical names is transparent to the authoritative name server.

In some embodiments, trap resource names 314 and trap canonical names 316 include mappings of trap resource or canonical names to trap canonical names. For example, trap canonical names 316 may include mappings of trap resource names to trap canonical names, and mappings of trap canonical names to trap canonical names. In this manner, the recursive name server 301 may resolve trap resource names and trap canonical names without actual resource records (e.g., resource records 214) containing trap resource names or trap canonical names, and without involvement of an authoritative name server. In some other embodiments, the trap resource names 314 and the trap canonical names 316 are stored at the recursive name server 301 as simulated resource records (e.g., as simulated CNAME records). In some other embodiments, the trap name resolution module 312 selects a trap canonical name from trap canonical names 316, or generates a trap canonical name, responsive to a request for resolution of a trap resource or canonical name. The trap canonical name may be selected or generated in accordance with an ordered sequence (e.g., a trap canonical name "chain0.00001.vrsn.com" may be selected or generated to resolve a trap canonical name "chain0.00000.vrsn.com") or random sequence (e.g., a name is selected or generated randomly).

In some embodiments, trap resource name(s) 314 are predefined. For example, one or more trap resource names 314 are predefined at recursive name server 301 by a network administrator. In some other embodiments, one or more trap resource names 314 are generated by the recursive name server 301 (e.g., by a name generation module, not shown). Trap resource names may be generated periodically or in response to user (e.g., a network administrator) direction and added to trap resource names 314. Trap resource names 314 may include predefined and/or generated trap resource names.

In some embodiments, trap canonical names 316 are predefined. For example, trap canonical names 316 are predefined at recursive name server 301 by a network administrator. In some other embodiments, trap canonical names 316 are generated by the recursive name server 301. The recursive name server 316 may generate trap canonical names periodically or in response to resolution requests, and add the generated trap canonical names to trap canonical names 316. For example, a trap canonical name may be generated in response to a resolution request that requests a trap canonical name for resolution.

Exemplary Chain of Trap Canonical Name Resolutions

Figure 4:
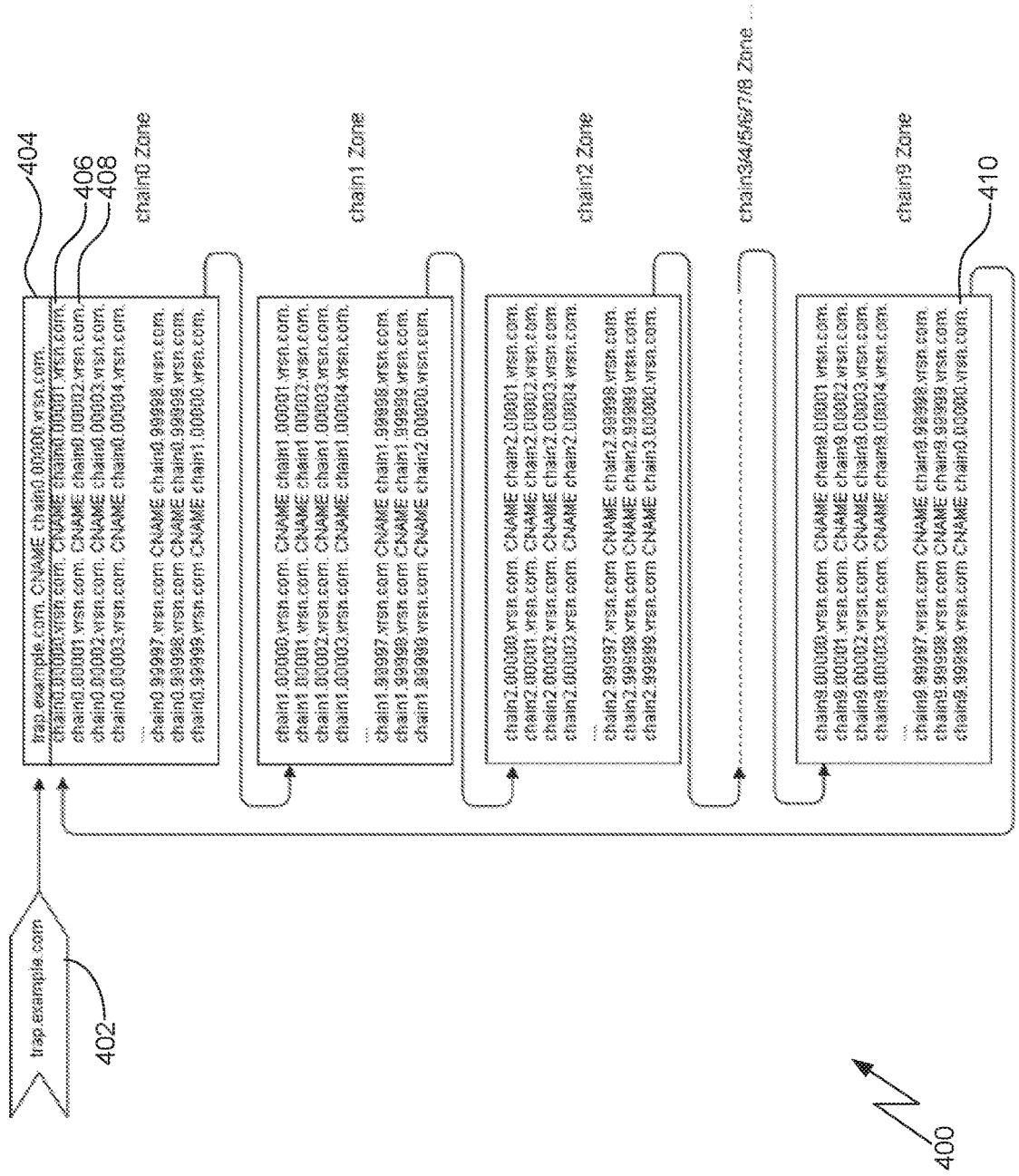
FIG. 4 illustrates an exemplary chain of trap canonical name resolutions, according to various embodiments of the present invention.

FIG. 4 illustrates an exemplary chain 400 of trap canonical name resolutions, represented by the corresponding trap resource name record and trap canonical name records, according to various embodiments of the present invention. FIG. 4 shows a trap resource name 402 "trap.example.com." The trap resource name 402 "trap.example.com" may be predefined by an administrator or generated, and may be stored in trap resource name records 216 (e.g., in a CNAME record) or in trap resource names 314.

When resolution of the trap resource name 402 "trap.example.com" is requested (e.g., by unauthorized software 104), a trap canonical name "chain0.00000.vrsn.com" is returned in response as resolution. In network environment 200, the authoritative name server 201 identifies from trap resource name records 216 the CNAME record 404 "trap.example.com CNAME chain0.00000.vrsn.com," which matches the requested trap canonical name, and returns the trap canonical name "chain0.00000.vrsn.com" from the CNAME record 404 as a response to the request. In network environment 300, the recursive name server 301 obtains (e.g., from trap canonical names 316) or generates the trap canonical name "chain0.00000.vrsn.com," and returns "chain0.00000.vrsn.com" as the response to the request. If the trap canonical name is generated, the generated name and the mapping from the trap resource name to the generated trap canonical name may be added to trap canonical names 316.

When resolution of the trap canonical name "chain0.00000.vrsn.com" is requested by unauthorized software 104, another trap canonical name "chain0.00001.vrsn.com" is returned in response. In network environment 200, the authoritative name server 201 identifies from trap canonical name records 218 the CNAME record 406 "chain0.00000.vrsn.com CNAME chain0.00001.vrsn.com," which matches the requested trap canonical name, and returns the trap canonical name "chain0.00001.vrsn.com" from CNAME record 406 as a response to the request. In network environment 300, the recursive name server 301 obtains (e.g., from trap canonical names 316) or generates the trap canonical name "chain0.00001.vrsn.com," and returns "chain0.00001.vrsn.com" as the response to the request.

When resolution of the trap canonical name "chain0.00001.vrsn.com" is requested by unauthorized software 104, another trap canonical name "chain0.00002.vrsn.com" is returned in response. In network environment 200, the authoritative name server 201 identifies from trap canonical name records 218 the CNAME record 408 "chain0.00001.vrsn.com CNAME chain0.00002.vrsn.com," which matches the requested trap canonical name, and returns the trap canonical name "chain0.00002.vrsn.com" from CNAME record 408 as a response to the request. In network environment 300, the recursive name server 301 obtains (e.g., from trap canonical names 316) or generates the trap canonical name "chain0.00002.vrsn.com," and returns "chain0.00002.vrsn.com" as the response to the request.

As shown in FIG. 4, the chain of trap canonical names resolving into other trap canonical names continues on from the name "chain0.00002.vrsn.com." In some embodiments, the trap canonical names in the chain form a sequence of names. The trap canonical names may have a common format, where one or more elements in the name format vary by name and form a sequence.

In some embodiments, the sequence is an ordered sequence. The ordered sequence of trap canonical names exhibits a non-random ordering (e.g., in numerical order), and one trap canonical name resolves into a succeeding name within the ordered sequence. For example, the trap canonical names as shown in FIG. 4 have the format "chainJ.KKKKK.vrsn.com," where the sequence is formed by initially incrementing, from 00000, the five digits represented by "KKKKK," while the digit represented by "J" initializes and stays at 0. When KKKKK reaches 99999, J is incremented by 1, and KKKKK is reset to 00000, and the incrementing repeats. In FIG. 4, the set of CNAME records labeled "chain0 Zone" refers to the set of CNAME records where trap canonical names with J set to 0 and K ranging from 00000 to 99999 inclusive are mapped to the next name in the sequence. The set of CNAME records labeled "chain1 Zone" refers to the set of CNAME records where trap canonical names with J set to 1 and K ranging from 00000 to 99999 inclusive are mapped to the next name in the sequence, and so on. Thus, the trap canonical names shown in FIG. 4 exhibit a numerical order based the ascending order of the KKKKK digits and then of the J digit. Trap canonical names, and corresponding trap canonical name records, in an ordered sequence may be predefined or generated (e.g., periodically, as needed, or on demand).

In some other embodiments, the sequence is a random sequence. That is, the trap canonical names are a sequence of randomly generated names one after another. The names may have a common format, where one or more elements in the name format vary by name and is randomly generated (e.g., as random numbers, as random alphanumeric character strings) for each name in the sequence. For example, the trap canonical names may have the format "chain.LLLLL.vrsn.com," where LLLLL represents a predefined number of digits. When a new trap canonical name in the sequence is generated, the new name is formed by generating a random number with the predefined number of digits in place of LLLLL. The last name in the sequence is mapped (e.g., resolves) to this newly generated name.

In some embodiments, the set of trap canonical names, and particularly the sequence of trap canonical names, is finite. The trap canonical name records 218 or trap canonical names 316 include a finite set of trap canonical names. For example, as shown in FIG. 4, the ordered sequence of trap canonical names are ordered in ascending order up to a last trap canonical name of the sequence, where J is 9 and KKKKK is 99999. For a finite sequence of trap canonical names, in some embodiments, the sequence ends, and a request to resolve the last name in the sequence results in an error response or a connection termination. In some other embodiments, the sequence loops back to the beginning of the sequence. For example, as shown in FIG. 4, the last name in the sequence "chain9.99999.vrsn.com" is mapped to, and resolves to, the first name in the sequence "chain0.00000.vrsn.com" by a CNAME record 410.

A random sequence of trap canonical names may be finite as well. For example, the number of random names generated for the random sequence for a particular chain of resolutions transmitted to a particular requesting piece of software (e.g., unauthorized software 104) may have a predefined maximum. Once the maximum number of random names has been generated for the chain, a request to resolve the last name in the random sequence may result in an error response or a connection termination by the DNS 112 (e.g., the authoritative name server 201, or the recursive name server 301).

In some embodiments, the sequence of trap canonical names is indefinite. The trap canonical name records 218 or trap canonical names 316 include a set of trap canonical names that can be added to indefinitely. The indefinite sequence may be an ordered sequence or a random sequence that has no defined maximum number of names.

In some embodiments, a sequence of trap canonical names, when logged, provides a trail of requests and responses that facilitate detection and investigation of the unauthorized software by the administrator. For example, the fact that a trap resource name and/or some number of trap canonical names are requested for resolution may trigger an alert for administrators. As another example, an ordered sequence of trap canonical names may facilitate estimation, by the administrator, of how long and fast the unauthorized software has been attempting to find resources in the network (e.g., based on how many trap canonical names in the ordered sequence have been returned to the unauthorized software for resolution and the rate at which the trap canonical names in the ordered sequence have been returned as resolution to the unauthorized software).

It should be appreciated that the trap canonical name formats described above and illustrated in FIG. 4 are merely exemplary. The set of trap canonical names may have any suitable format. Further, while FIG. 4 illustrates the chain 400 of trap canonical name resolutions as corresponding CNAME records, it should be appreciated that the name mappings in the chain 400 may be achieved by a list or table that includes the name mappings.

Figure 5:
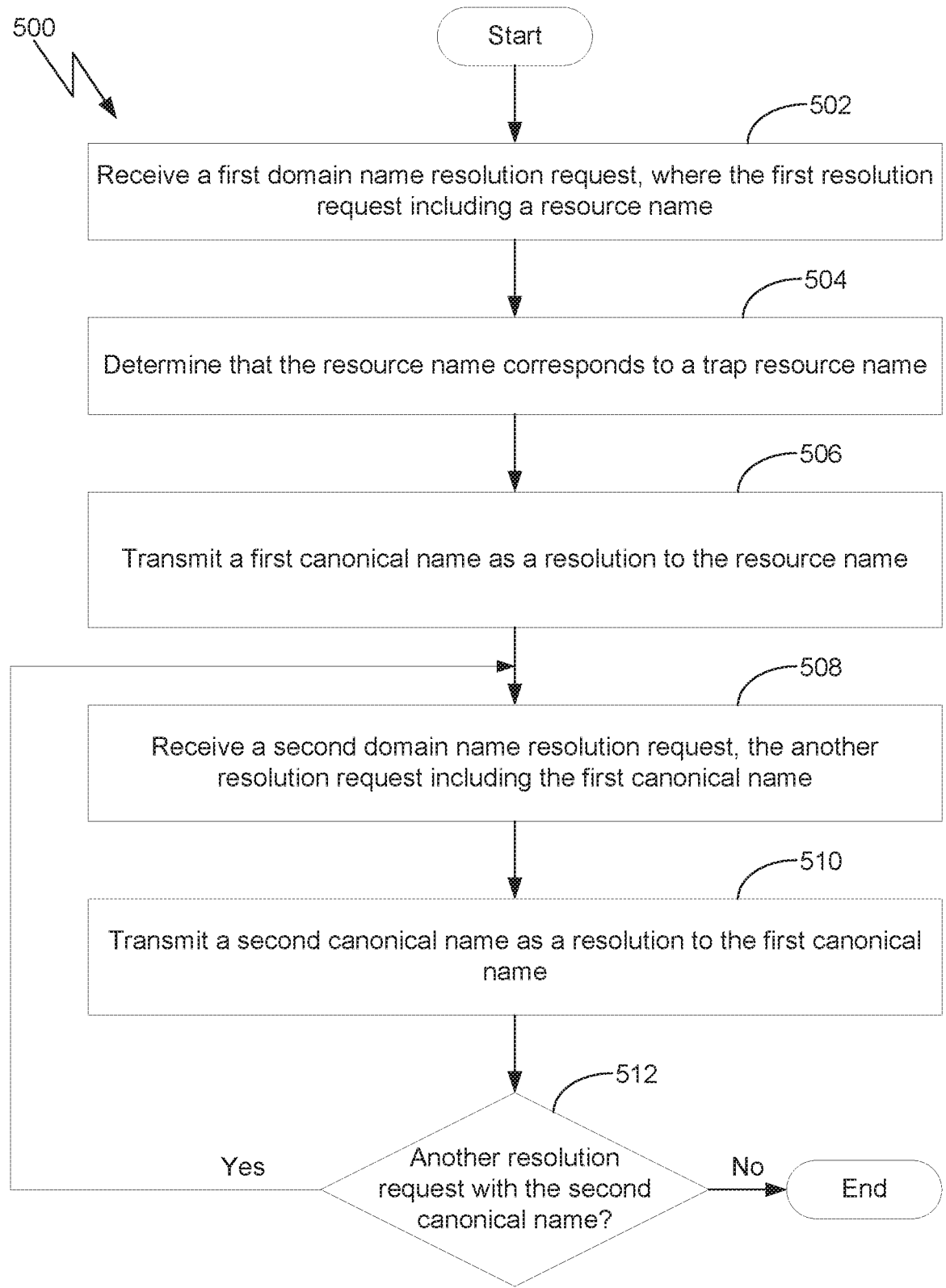
FIG. 5 is a flow diagram of method steps for impeding the ability of unauthorized software to traverse a network, according to various embodiments of the present invention.

FIG. 5 is a flow diagram of method steps for impeding the ability of unauthorized software to traverse a network, according to various embodiments of the present invention. Although the method steps are described with respect to the network environments and systems of FIGS. 1-4, persons skilled in the art will understand that any system configured to implement the method steps, in any order, falls within the scope of the present invention.

As shown, a method 500 begins at step 502, where DNS 112 receives a first domain name resolution request from a device 102. The first domain name resolution request includes a resource name. For example, in network environment 200, a domain name resolution request may be sent by unauthorized software 104 at device 102. The request is received by authoritative name server 201. The request includes a resource name for which resolution is requested. As another example, in network environment 300, a domain name resolution request may be sent by unauthorized software 104 at device 102. The request is received by recursive name server 301. The request includes a resource name for which resolution is requested.

At step 504, DNS 112 determines that the resource name corresponds to a trap resource name. For example, in network environment 200, name resolution module 210 of authoritative name server 201 matches the requested resource name in the first request to a trap resource name in a trap resource name record 216. As another example, in network environment 300, recursive name resolution module 310 of recursive name server 301 matches the requested resource name in the first request to a trap resource name 314.

At step 506, DNS 112 transmits a first canonical name to the device 102 as resolution to the resource name. For example, in network environment 200, name resolution module 210 of authoritative name server 201 returns to device 102 the trap canonical name in the trap resource name record 216 as resolution to the resource name in the first request. As another example, in network environment 300, trap name resolution module 312 of recursive name server 301 returns to device 102 a trap canonical name 316 as resolution to the resource name in the first request.

At step 508, the DNS 112 receives a second domain name resolution request from the device 102, where the second resolution request includes the first canonical name. For example, in network environment 200, a second domain name resolution request may be sent by unauthorized software 104 at device 102. The second request is received by authoritative name server 201. The second request includes the first trap canonical name returned as a response to the first request. As another example, in network environment 300, a second domain name resolution request may be sent by unauthorized software 104 at device 102. The request is received by recursive name server 301. The second request includes the first trap canonical name returned as a response to the first request.

At step 510, the DNS 112 transmits a second canonical name to the device 102 as a resolution to the first canonical name. For example, in network environment 200, name resolution module 210 of authoritative name server 201 returns to device 102 a second trap canonical name from a trap canonical name record 218 as resolution to the first trap canonical name requested in the second request. The trap canonical name record maps the first trap canonical name to the second trap canonical name. As another example, in network environment 300, trap name resolution module 312 of recursive name server 301 returns to device 102 a second trap canonical name 316 as resolution to the first trap canonical name requested in the second request.

At step 512, the DNS 112 may receive another domain name resolution request from the device 102, where the another resolution request includes the canonical name returned in response to the previous request from the same device 102. For example, in network environment 200, a third domain name resolution request may be sent by unauthorized software 104 at device 102. The third request is received by authoritative name server 201. The third request includes the second trap canonical name returned as a response to the second request. As another example, in network environment 300, a third domain name resolution request may be sent by unauthorized software 104 at device 102. The request is received by recursive name server 301. The third request includes the second trap canonical name returned as a response to the second request.

If the DNS 112 did receive such a resolution request (512—Yes), then the DNS 112 processes the resolution request in a manner similar to steps 508 and 510 described above. If the DNS 112 did not receive such a resolution request (512—No), then the method 500 ends.

Throughout the method 500, the DNS 112 (e.g., logging module 220 of authoritative name server 201, logging module 318 of recursive name server 301) may log the received domain name resolution requests and corresponding responses. The authoritative name server 201 or recursive name server 301 logs at least the request, the corresponding response (e.g., the name or IP address returned as resolution to the requested name), and the requesting device. Optionally, the piece of software that made the request (e.g., an identifier of the software) is also logged.

In sum, the disclosed techniques enable the DNS of a network to impede the ability of unauthorized software to access resources within a network and generate an activity trail for the unauthorized software. In operation, when unauthorized software within the network of an organization attempts to resolve a resource name to an IP address with the DNS, the DNS determines whether the resource name corresponds to a trap resource name. If the resource name corresponds to a trap resource name, then the domain name system provides a trap canonical name to the unauthorized software as a resolution to the resource name. If the unauthorized software requests resolution of the trap canonical name from the DNS, then the DNS provides another trap canonical name for resolution. The process repeats when the unauthorized software requests resolution of the trap canonical name, and is provided another trap canonical name as resolution to the trap canonical name. By providing trap canonical names as resolutions to trap canonical names, the unauthorized software is kept occupied with resolving canonical name after canonical name, giving network administrators additional time to discover and handle the unauthorized software, while preventing further damage to the network and/or organization.

Advantageously, the techniques disclosed herein enable a DNS to impede the ability of unauthorized software to access resources within a network of an organization. In particular, the unauthorized software is kept occupied resolving canonical name after canonical name, thus preventing further damage to the network and/or the organization. Additionally, the techniques disclosed herein enable the DNS to log the trap canonical name resolution requests, thus generating an activity trail of the unauthorized software, giving network administrators additional time to discover and handle the unauthorized software.

1. In some embodiments, a computer-implemented method comprises receiving a first domain name resolution request from a computing device within a network, wherein the first domain name resolution request includes a resource name; determining that the resource name corresponds to a trap resource name, wherein the trap resource name is associated with a trap set up within the network; transmitting a first canonical name to the computing device as a resolution to the resource name; receiving a second domain name resolution request from the computing device, wherein the second domain name resolution request includes the first canonical name; and transmitting a second canonical name to the computing device as a resolution to the first canonical name.

2. The method of clause 1, wherein the first canonical name and the second canonical name are included in an ordered sequence of trap canonical names, and the second canonical name succeeds the first canonical name within the ordered sequence.

3. The method of clauses 1 or 2, wherein the first canonical name and the second canonical name are included in a random sequence of trap canonical names, and the second canonical name succeeds the first canonical name within the random sequence.

4. The method of any of clauses 1-3, further comprising obtaining the second canonical name from a resource record mapping the first canonical name to the second canonical name.

5. The method of any of clauses 1-4, further comprising randomly generating the second canonical name in response to the second domain name resolution request.

6. The method of any of clauses 1-5, wherein the first canonical name and the second canonical name are included in an indefinite set of trap canonical names.

7. The method of any of clauses 1-6, wherein the first canonical name and the second canonical name are included in a finite set of trap canonical names.

8. The method of any of clauses 1-7, further comprising generating a resource record mapping the trap resource name to the first canonical name; and obtaining the first canonical name from the generated resource record.

9. The method of any of clauses 1-8, wherein generating a resource record mapping the trap resource name to the first canonical name comprises generating the resource record in response to determining that the resource name corresponds to a trap resource name.

10. In some embodiments, a computer system comprises a memory including instructions; and a processor that is coupled to the memory and, when executing the instructions, is configured to perform the steps of receiving a first domain name resolution request from a computing device within a network, wherein the first domain name resolution request includes a resource name; determining that the resource name corresponds to a trap resource name, wherein the trap resource name is associated with a trap set up within the network; transmitting a first canonical name to the computing device as a resolution to the resource name; receiving a second domain name resolution request from the computing device, wherein the second domain name resolution request includes the first canonical name; and transmitting a second canonical name to the computing device as a resolution to the first canonical name.

11. The system of clause 10, wherein the system is an authoritative name server or a recursive name server.

12. In some embodiments, a computer-readable storage medium stores instructions that, when executed by one or more processors, cause the one or more processors to perform operations comprising receiving a first domain name resolution request from a computing device within a network, wherein the first domain name resolution request includes a resource name; determining that the resource name corresponds to a trap resource name, wherein the trap resource name is associated with a trap set up within the network; transmitting a first canonical name to the computing device as a resolution to the resource name; receiving a second domain name resolution request from the computing device, wherein the second domain name resolution request includes the first canonical name; and transmitting a second canonical name to the computing device as a resolution to the first canonical name.

13. The computer-readable storage medium of clause 12, wherein the first canonical name and the second canonical name are included in an ordered sequence of trap canonical names, and the second canonical name succeeds the first canonical name within the ordered sequence.

14. The computer-readable storage medium of clauses 12 or 13, wherein the first canonical name and the second canonical name are included in a random sequence of trap canonical names, and the second canonical name succeeds the first canonical name within the random sequence.

15. The computer-readable storage medium of any of clauses 12-14, further storing instructions that, when executed by the one or more processors, cause the one or more processors to perform operations comprising: obtaining the second canonical name from a resource record mapping the first canonical name to the second canonical name.

16. The computer-readable storage medium of any of clauses 12-15, wherein obtaining the second canonical name from a resource record mapping the first canonical name to the second canonical name comprises generating the resource record mapping the first canonical name to the second canonical name in response to the second domain name resolution request.

17. The computer-readable storage medium of any of clauses 12-16, further storing instructions that, when executed by the one or more processors, cause the one or more processors to perform operations comprising: randomly generating the second canonical name in response to the second resolution request.

18. The computer-readable storage medium of any of clauses 12-17, wherein determining that the resource name corresponds to a trap resource name comprises determining that the resource name matches a predefined trap resource name.

19. The computer-readable storage medium of any of clauses 12-18, wherein determining that the resource name corresponds to a trap resource name comprises matching the resource name to a trap resource name in a trap resource record that maps the trap resource name to the first canonical name.

20. The computer-readable storage medium of any of clauses 12-19, further storing instructions that, when executed by the one or more processors, cause the one or more processors to perform operations comprising receiving a third domain name resolution request from the computing device, wherein the third domain name resolution request includes the second canonical name; and transmitting a third canonical name to the computing device as a resolution to the second canonical name.

21. The computer-readable storage medium of any of clauses 12-20, wherein the trap resource name is associated with an actual resource within the network that stores junk data or no data.

22. The computer-readable storage medium of any of clauses 12-21, wherein the trap resource name comprises a fake resource name that is included in a network directly and is not associated with an actual resource within the network.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed towards embodiments of the present disclosure, other and further embodiments of the disclosure may be devised without departing from the basic scope thereof, and the scope thereof is determined by the claims that follow. In that regard, any and all combinations of any of the claim elements recited in any of the claims and/or any elements described in this application, in any fashion, fall within the contemplated scope of the present invention and protection.

What is claimed is:

1. A computer-implemented method, comprising:
   receiving a first domain name resolution request from a computing device within a network, wherein the first domain name resolution request includes a requested resource name;
   determining that the requested resource name matches a trap resource name, wherein the trap resource name corresponds to a trap resource that is set up within the network;
   transmitting, to the computing device, a first canonical name associated with the trap resource as a resolution to the resource name;
   receiving, from the computing device, a second domain name resolution request that includes the first canonical name; and
   transmitting, to the computing device, a second canonical name associated with the trap resource as a resolution to the first canonical name.

2. The method of claim 1, wherein the first canonical name and the second canonical name are included in an ordered sequence of trap canonical names, and the second canonical name succeeds the first canonical name within the ordered sequence.

3. The method of claim 1, wherein the first canonical name and the second canonical name are included in a random sequence of trap canonical names, and the second canonical name succeeds the first canonical name within the random sequence.

4. The method of claim 1, further comprising obtaining the second canonical name from a resource record mapping the first canonical name to the second canonical name.

5. The method of claim 1, further comprising randomly generating the second canonical name in response to the second domain name resolution request.

6. The method of claim 1, wherein the first canonical name and the second canonical name are included in an indefinite set of trap canonical names.

7. The method of claim 1, wherein the first canonical name and the second canonical name are included in a finite set of trap canonical names.

8. The method of claim 1, further comprising:
   generating a resource record mapping the trap resource name to the first canonical name; and
   obtaining the first canonical name from the generated resource record.

9. The method of claim 8, wherein generating a resource record mapping the trap resource name to the first canonical name comprises generating the resource record in response to determining that the requested resource name matches the trap resource name.

10. A computer system, comprising:
    a memory including instructions; and
    a processor that is coupled to the memory and, when executing the instructions, performs the steps of:
    receiving a first domain name resolution request from a computing device within a network, wherein the first domain name resolution request includes a requested resource name;
    determining that the requested resource name matches a trap resource name, wherein the trap resource name corresponds to a trap resource set up within the network;
    transmitting, to the computing device, a first canonical name associated with the trap resource as a resolution to the resource name;
    receiving, from the computing device, a second domain name resolution request that includes the first canonical name; and
    transmitting, to the computing device, a second canonical name associated with the trap resource as a resolution to the first canonical name.

11. The system of claim 10, wherein the system is an authoritative name server or a recursive name server.

12. One or more non-transitory computer-readable storage media storing instructions that, when executed by one or more processors, cause the one or more processors to perform the steps of:
    receiving a first domain name resolution request from a computing device within a network, wherein the first domain name resolution request includes a requested resource name;
    determining that the requested resource name matches a trap resource name, wherein the trap resource name corresponds to a trap resource set up within the network;
    transmitting, to the computing device, a first canonical name associated with the trap resource as a resolution to the resource name;
    receiving, from the computing device, a second domain name resolution request that includes the first canonical name; and
    transmitting, to the computing device, a second canonical name associated with the trap resource as a resolution to the first canonical name.

13. The one or more non-transitory computer-readable storage media of claim 12, wherein the first canonical name and the second canonical name are included in an ordered sequence of trap canonical names, and the second canonical name succeeds the first canonical name within the ordered sequence.

14. The one or more non-transitory computer-readable storage media of claim 12, wherein the first canonical name and the second canonical name are included in a random sequence of trap canonical names, and the second canonical name succeeds the first canonical name within the random sequence.

15. The one or more non-transitory computer-readable storage media of claim 12, further storing instructions that, when executed by the one or more processors, cause the one or more processors to perform the step of obtaining the second canonical name from a resource record mapping the first canonical name to the second canonical name.

16. The one or more non-transitory computer-readable storage media of claim 15, wherein obtaining the second canonical name from a resource record mapping the first canonical name to the second canonical name further comprises generating the resource record mapping the first canonical name to the second canonical name in response to the second domain name resolution request.

17. The one or more non-transitory computer-readable storage media of claim 12, further storing instructions that, when executed by the one or more processors, cause the one or more processors to perform the step of randomly generating the second canonical name in response to the second domain name resolution request.

18. The one or more non-transitory computer-readable storage media of claim 12, wherein determining that the requested resource name matches the trap resource name comprises matching the requested resource name to the trap resource name included in a trap resource record that maps the trap resource name to the first canonical name.

19. The one or more non-transitory computer-readable storage media of claim 12, further storing instructions that, when executed by the one or more processors, cause the one or more processors to perform operations comprising:
   receiving a third domain name resolution request from the computing device, wherein the third domain name resolution request includes the second canonical name; and
   transmitting, to the computing device, a third canonical name as a resolution to the second canonical name.

20. The one or more non-transitory computer-readable storage media of claim 12, wherein the trap resource name corresponds to a resource that stores junk data or no data.

21. The one or more non-transitory computer-readable storage media of claim 12, wherein the trap resource name comprises a fake resource name that is included in a network directory.

* * * * *